US008730383B2

(12) United States Patent
Burrell

(10) Patent No.: US 8,730,383 B2
(45) Date of Patent: May 20, 2014

(54) SYSTEM AND METHOD FOR CONTROLLING ILLUMINATION IN A VISION SYSTEM

(75) Inventor: Paul Burrell, Wilsonville, OR (US)

(73) Assignee: Cognex Corporation, Natick, MA (US)

( * ) Notice: Subject to any disclaimer, the term of this patent is extended or adjusted under 35 U.S.C. 154(b) by 225 days.

(21) Appl. No.: 13/308,092

(22) Filed: Nov. 30, 2011

(65) Prior Publication Data

US 2013/0135521 A1   May 30, 2013

(51) Int. Cl.
*H04N 17/00* (2006.01)
*H04N 5/225* (2006.01)

(52) U.S. Cl.
USPC .......................................... 348/371; 348/187

(58) Field of Classification Search
USPC .................... 348/187, 188, 370, 371; 396/155
See application file for complete search history.

(56) References Cited

U.S. PATENT DOCUMENTS

| | | | |
|---|---|---|---|
| 4,477,164 A | 10/1984 | Nakai et al. | |
| 4,724,453 A | 2/1988 | Hamano | |
| 6,101,333 A * | 8/2000 | Bullitt et al. | 396/61 |
| 6,292,901 B1 | 9/2001 | Lys et al. | |
| 6,340,868 B1 | 1/2002 | Lys et al. | |
| 6,488,390 B1 | 12/2002 | Lebens et al. | |
| 7,135,824 B2 | 11/2006 | Lys et al. | |
| 7,233,115 B2 | 6/2007 | Lys | |
| 7,256,554 B2 | 8/2007 | Lys | |
| 7,781,979 B2 | 8/2010 | Lys | |
| 7,816,638 B2 | 10/2010 | Olson et al. | |
| 8,294,813 B2 * | 10/2012 | Kawaguchi et al. | 348/371 |
| 8,502,870 B2 * | 8/2013 | Bentkovski | 348/155 |
| 2003/0174238 A1 | 9/2003 | Wu | |
| 2004/0105264 A1 | 6/2004 | Spero | |
| 2005/0265014 A1 | 12/2005 | Matsui et al. | |
| 2007/0196095 A1 | 8/2007 | Perala et al. | |
| 2008/0136960 A1 * | 6/2008 | Kawakami | 348/371 |
| 2008/0218618 A1 * | 9/2008 | Pfeffer et al. | 348/294 |
| 2009/0040332 A1 | 2/2009 | Yoshino et al. | |
| 2010/0020200 A1 * | 1/2010 | Fujiwara | 348/234 |
| 2011/0128402 A1 * | 6/2011 | Lim et al. | 348/222.1 |
| 2011/0205049 A1 | 8/2011 | Kmetec | |
| 2011/0298947 A1 * | 12/2011 | Guo et al. | 348/224.1 |
| 2012/0127361 A1 * | 5/2012 | Clark | 348/371 |

FOREIGN PATENT DOCUMENTS

WO    2006002587 A1    1/2006

* cited by examiner

*Primary Examiner* — Timothy J Henn
(74) *Attorney, Agent, or Firm* — Loginov & Sicard

(57) ABSTRACT

This invention provides a system and method for enabling control of an illuminator having predetermined operating parameters by a vision system processor/core based upon stored information regarding parameters that are integrated with the illuminator. The parameters are retrieved by the processor, and are used to control the operation of the illuminator and/or the camera during image acquisition. In an embodiment, the stored parameters are a discrete numerical or other value that corresponds to the illuminator type. The discrete value maps to a corresponding value in look-up table/database associated with the camera that contains parameter sets associated with each of a plurality of values in the database. The data associated with the discrete value in the camera contains the necessary parameters or settings for that illuminator type. In other embodiments, some or all of the actual parameter information can be stored with the illuminator and retrieved by the camera processor.

14 Claims, 7 Drawing Sheets

SYSTEM AND METHOD FOR CONTROLLING ILLUMINATION IN A VISION SYSTEM

FIELD OF THE INVENTION

This invention relates to vision systems and more particularly to illuminators and control of illumination in a vision system.

BACKGROUND OF THE INVENTION

Vision systems that perform measurement, inspection, alignment of objects and/or decoding of symbology (e.g. bar codes) are used in a wide range of applications and industries. These systems are based around the use of an image sensor, which acquires images (typically grayscale or color, and in one, two or three dimensions) of the subject or object, and processes these acquired images using an on-board or remote, interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of a symbology (barcode) reader, the user or automated process acquires an image of an object that is believed to contain one or more barcodes. The image is processed to identify barcode features, which are then decoded by a decoding process and/or processor obtain the inherent alphanumeric data represented by the code. In other types of vision systems, various vision system tools (e.g. edge detectors, calipers, blob analysis) are employed by the system processor to detect edges and other features that allow for recognition of object features, and the determination of desired information based upon these features—for example whether the object is defective or whether it is properly aligned.

It is increasingly desirable to provide vision systems and associated vision system components that can be used for a variety of purposes and a range of environments. Likewise, vision systems that can take advantage of improved technologies, such as more-efficient illuminators are desirable. In any vision system, a major component is the vision system camera assembly. The camera assembly includes a lens (optics) and an imager (or "sensor") that provides the array of image pixel information. The vision system processor receives the pixel data from the imager/sensor and processes it to derive useful vision system information about the imaged scene and/or object. The vision system processor and related components (e.g. data memory, decoders, etc.) can be provided within the camera assembly's physical housing or enclosure, or some or all of these vision processing components can be mounted remotely (e.g. within a PC, or other remote, self-contained processing system), and linked by a wired or wireless interconnect.

Another significant component of many vision system cameras is the illumination assembly. To adequately acquire an image of an object's (or scene's) surface, it is desirable to illuminate it with illumination that exhibits the appropriate intensity, spread, wavelength and timing for a particular acquisition task. Depending upon the features being imaged and the relative angle of the camera axis to the features, the type and characteristics of illumination employed can vary widely. For example, some features (e.g. peened features) can be best imaged using low-angle illumination, while other features (e.g. printed, high-contrast features) are typically best imaged using direct, high-angle illumination. Likewise, the wavelength of illumination can vary depending on the nature of the features—that is, some features are best illuminated in the visible range, while others may be enhanced using infrared (IR) or ultraviolet (UV) light. Likewise, for some applications it is desirable to employ polarized light and/or to filter the light entering the camera with a polarizer or other appropriate optical filter. Many camera systems include a ring illumination arrangement consisting of one or more rows of that encircle the camera lens. These illuminators can be external and remote from the camera housing, but are also often "internal", being fixed in place on the front of the camera. A common form of ring illuminator, which surrounds the camera lens, is constructed on a circuit board that contains a predetermined number of lighting elements in one or more circles around the lens axis. The lighting elements on a typical illuminator are LEDs, but other types of light sources (e.g. xenon strobes, laser diodes, etc) can also be employed, either as an alternative to LEDs or in addition to LEDs.

In an external illuminator, a dedicated light arrangement is typically used to provide desired illumination to the scene from a desired vantage point that can be remote from the camera and its lens axis. It is typically interconnected with the camera assembly or other device by a cable that provides trigger signals from the camera and can provide other data to and from the camera. The external illuminator is typically pre-configured with an appropriate light source, controller, and interface circuit that is adapted to connect to most camera assemblies. The external lighting arrangement is typically user-installable and configurable.

With conventional internal lighting systems, most camera manufacturers prevent the user from installing or changing-out the lighting system that is integrated in the camera. One reason that the internal illumination assembly is not adapted for exchangeability is that there exists a risk of installation and/or configuration errors by the end user. This is because the camera may be set to acquire images based upon a certain set of illumination parameters, that when changed, may not be accommodated by the camera's vision processor (or "core") and lighting controller. These illumination parameters can include (but are not limited to) operating voltage and current, startup timing, maximum time on, maximum temperature, maximum power and the light intensity for a given level of output current. Failure to properly accommodate these parameters within the camera can result in poor image acquisition or even damage to the equipment.

As noted above, the ability to provide a more-versatile and upgradable vision system is desirable. Part of the desired versatility and upgradability is the ability to provide an illuminator to the camera that is particularly suited to the vision task and straightforward to set up without the risk of improperly setting parameters. Moreover, the ability to change out that illuminator at a subsequent time (e.g. in the field) is further desirable). This exchangeability is particularly desirable with illuminators that are controlled internally, but also with external illuminators that may require some control by the camera assembly.

SUMMARY OF THE INVENTION

This invention overcomes disadvantages of the prior art by providing a system and method for enabling control of an illuminator having predetermined operating parameters by a vision system processor/core based upon stored information about the parameters that are integrated with the illuminator. The parameters are retrieved by the processor at predetermined times (e.g. at camera startup) and are used to control the operation of the illuminator and/or the camera during image acquisition. In an embodiment, the stored parameters are a discrete numerical or other value (e.g. a preset analog resistance value) that corresponds to the illuminator type. The discrete value maps to a corresponding value in look-up table/database associated with the camera that contains sets of parameters respectively associated with each a plurality of values in the database. The data associated with the discrete value in the camera contains the necessary parameters or settings for that illuminator type. In other embodiments, some or all of the actual parameter information can be stored with the illuminator and retrieved by the camera processor.

In an illustrative embodiment, a system and method for controlling illumination of a vision system camera an image sensor in the camera that performs image acquisition. An illuminator is removably coupled to the vision system camera and typically linked by an electrical connector and/or cable, or alternatively by a wireless link. An information source is operatively connected with the illuminator, and is typically integrated with the illuminator's circuit board. This information source contains predetermined information indicative of parameters of the illuminator. The system and method further provides a controller that reads and identifies the predetermined information, and thereby controls at least one of (a) the image acquisition by the image sensor and (b) signals provided to control the illuminator based upon the parameters indicated for the illuminator.

In an embodiment, the illuminator is internal, being mounted on a housing of the vision system camera. Moreover, the predetermined information comprises a value that corresponds to a set of parameters for a predetermined type of illuminator. This set of parameters is stored with respect to the controller within a memory of the vision system camera. The memory can be integrated directly into the processor/core, or interconnected with it. The parameters of the illuminator can include at least one of illuminator operating current, operating voltage, illumination intensity, and timing.

BRIEF DESCRIPTION OF THE DRAWINGS

The invention description below refers to the accompanying drawings, of which.

DETAILED DESCRIPTION

Figure 1:
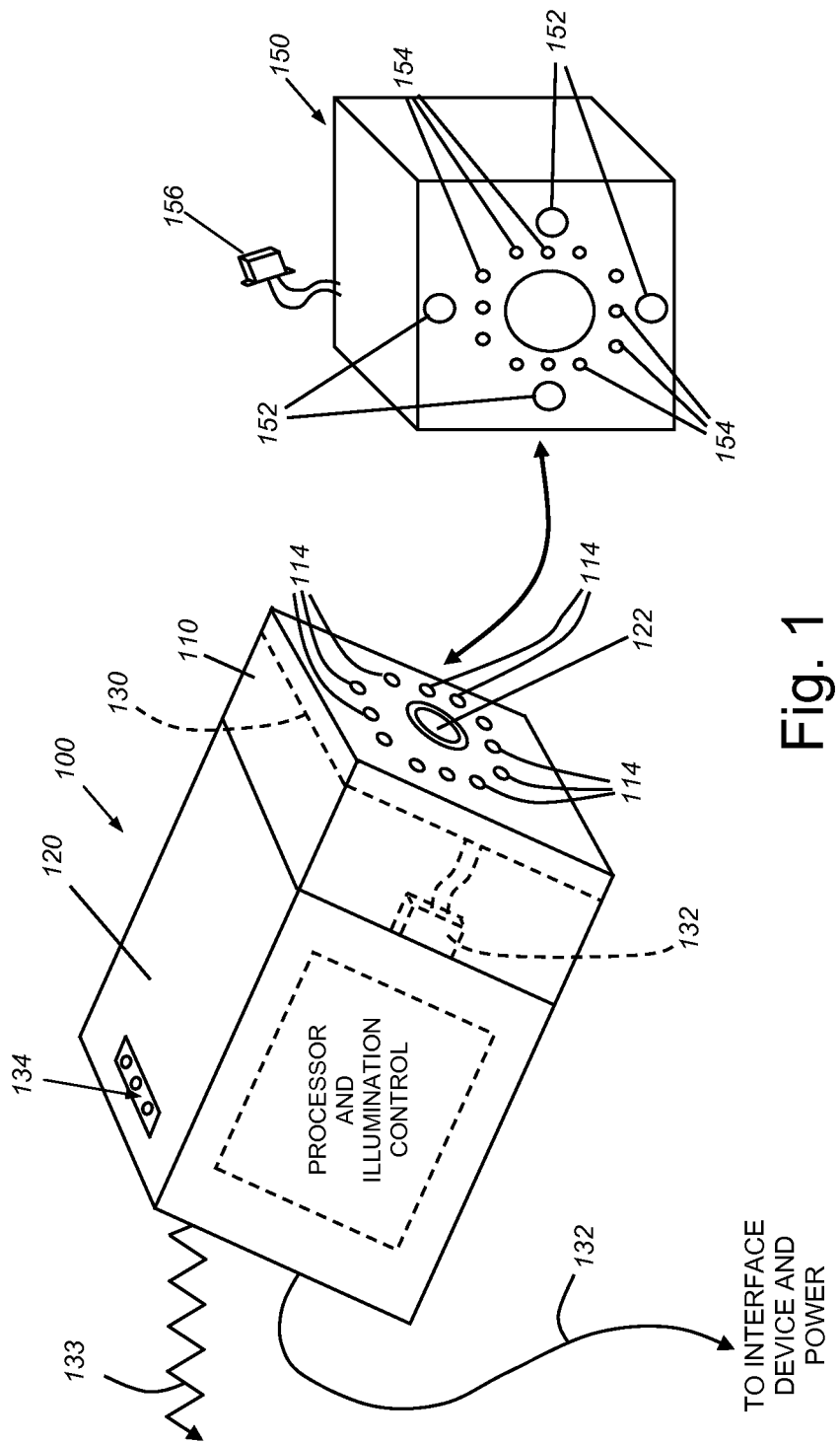
FIG. 1 is a diagram of an exemplary vision system camera having a mounted internal illuminator with a predetermined configuration that includes stored parameter information, and an exchangeable illuminator with a differing configuration/parameters that can be mounted by the manufacturer or by an end user to provide a specific configuration of illumination.

FIG. 1 shows an exemplary vision system camera arrangement 100 that includes an internal illuminator assembly 110 removably (or permanently) mounted on the front face of the camera enclosure or housing 120. The shape/form factor of the illuminator 110 is highly variable in alternate embodiments, as is the technique by which it is secured to the camera. As used herein, the term "illuminator" shall refer generally to internal illuminators that are controlled by the camera processor/core, and external illuminators that communicate with the vision system camera and rely on the setting of at least some parameters within the processor or core (see FIG. 7, below). Also, as used herein, the term "processor" in relation to the camera core shall refer to one or more processing components that are generally contained within the camera unit, but that can be (at least in part) located remote from the camera unit enclosure and that carry out the illustrative functions described herein. These functions include control of the illuminator and settings that are dependent on the illuminator's parameters. Other image processing and camera-control functions can also be performed by the "processor."

The illustrative illuminator 110 includes an array of light elements (e.g. high-output LEDs) 114 arranged around a lens 122 that optically communicates with an image sensor (or "imager") of conventional or novel design (not shown). The imager can reside on a circuit board within the camera's housing 120 that also includes the camera's image processor/core 126 (shown as a dashed-line box). The LEDs 114 reside on a circuit board 130 (shown in phantom). The circuit board 130 is interconnected with the camera via a detachable or fixed interconnection 132 (also shown in phantom). In this embodiment, the interconnection includes a detachable multi-pin connector that interfaces with a corresponding connector on or in the camera housing.

The camera arrangement 100 can allow for interconnection of power, networks and/or interface devices (e.g. PCs, hand-held computers, Smartphones, and the like) for setup, programming, diagnostics and general data handling via one or more wired link(s) 132 (and/or wireless link(s) 133). The camera can also include various indicators 134 for power, status and other vision system functions (e.g. positive identification of a recognized part or feature).

As shown, the camera arrangement 100 offers a choice of illuminator types with differing configurations or characteristics. By way of example, in addition to the mounted illuminator 110, the camera assembly accommodates another type of illuminator 150. In this example, the second illuminator 150 includes a second bank of light elements 152 in addition to the ring illuminator LEDs 154. A similar connector 156 is used to interconnect the illuminator with the camera in this embodiment. The depicted examples are generally part of wide variety of examples in which the camera can potentially accommodate two or more illuminators have differing configurations and/or operating parameters. When a particular illuminator is connected to the camera, its associated parameters must be taken into account by the system. Failure to properly set the parameters can result in poor image acquisition or even damage to camera components, as described above.

Figure 2:
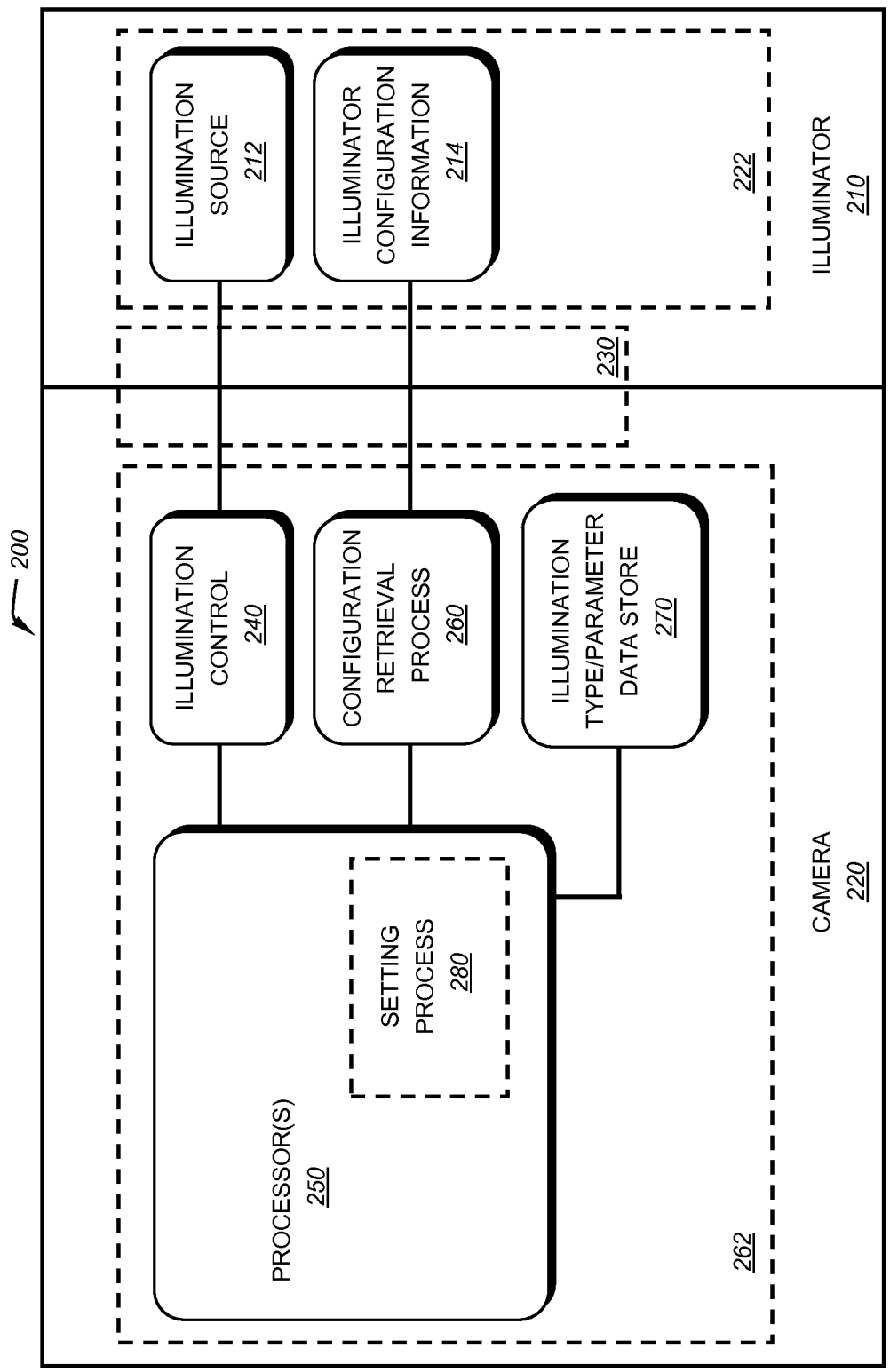
FIG. 2 is a block diagram of the vision system camera of FIG. 1 showing the functional components thereof, including those for storage and retrieval of parameter information.

With reference to FIG. 2, the functional blocks of the vision system camera 220 and an illustrative illuminator 210 are shown in a simplified block diagram 200. The Illuminator block 210 includes the illumination source 212, which can include various light elements (e.g. LEDs), power supply and other operational components that represent a certain set of parameters. Also provided is an information source 214 that contains a form of information related to the specific parameters of the illuminator. The contents of the information source are described further below with reference to FIGS. 3 and 4. This information source 214 can be operatively connected to the illuminator by a variety techniques. For example, the information source can comprise a separate circuit and/or circuit board that is housed within an overall enclosure of the illuminator. Illustratively, the information source 214 can reside on one of the illuminator's circuit boards. For the purposes of illustration the illuminator's circuit board(s) are represented by the dashed box 222 surrounding the processes and processing components. Both the illumination source 212 and the information source are linked via a connection (removable, fixed, etc.) represented as dashed-line box 230 to the operative components of the camera 220. As shown, the illumination source 212 communicates with the illumination control process/processor 240, which can be part of the overall camera processor/core 250. The configuration information in the information source 214 is linked to a configuration retrieval process/processor 260, that reads the information contained in (or integrated with) the illuminator 210, and enables the processor/core 250 to determining the type and/or parameters of the connected illuminator. As used herein, the term "integrated" shall mean that the element is typically carried with the underlying component. It can be on a common circuit board of the component or otherwise contained within a housing or enclosure that contains the component. For the purposes of illustration the camera's circuit board(s) are represented by the dashed box 262 surrounding the processes and processing components. The integrated element is provided so that it moves with the component when it is attached to or detached from another component.

Figure 3:
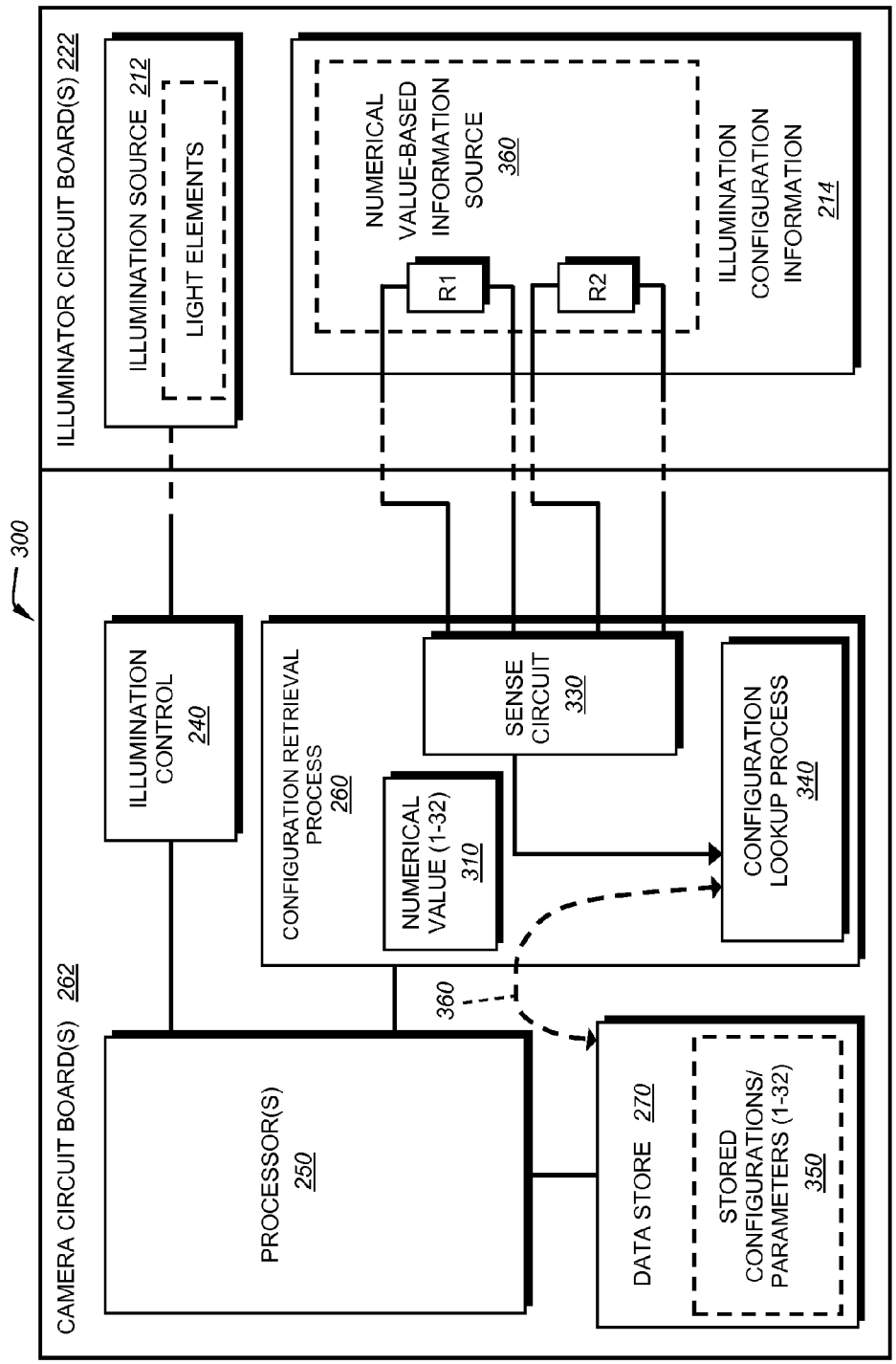
FIG. 3 is a block diagram showing a data store on an illuminator circuit board using an exemplary arrangement of analog resistors (among other types of value-based information sources) that define a discrete value and a circuit integrated with the camera for retrieving this value according to an embodiment.

With reference also to the block diagram 300 of FIG. 3 in addition to the overview of FIG. 2, an illustrative embodiment of the camera and illuminator arrangement is shown in further functional/structural detail with respect to the illuminator and camera circuit boards (222 and 262). As shown in FIG. 3, the retrieved configuration information (stored in the information source 214) illustratively specifies the type of illuminator as a numerical value 310. This type (e.g. 1-32) is associated by the processor/core 250 with a set of information (dashed block 350) stored within the data store 270 that is integrated with the processor/core 250. More particularly, the illustrative embodiment employs a pair or analog resistors R1 and R2 on the illuminator circuit board 222 that allow a number of resistance values to be set based on the specific type of illuminator. In an embodiment, 32 discrete resistance values can be set and are sensed by a conventional sensing circuit (e.g. an analog-to-digital converter) 330. This circuit 330 passes a numerical value 310 to the processor/core, which runs a configuration lookup process 340 based upon the number. This lookup process 340 retrieves (see dashed arrow 360) the set of stored configurations and/or parameters 350 from the on board data store (which can reside on one of the camera circuit boards or directly within the circuit die of the processor/core 250). The number is associated with a configuration/parameter data entry in the data store 270. In other words, selecting type #1 retrieves the values Voltage V1, Current C1, Timing T1, etc. for use in setting the cameras parameters and controlling the illuminator. Conversely selecting type 22 retrieves values Voltage V22, Current C22, Timing, T22, etc. The setting of the camera's imaging and/or illuminator control parameters is accomplished by a setting process 280 (see FIG. 2) within the processor or core 250, can operate to change camera and/or illumination control settings using conventional programming techniques based upon the retrieved illumination parameters.

The illustrative arrangement of FIG. 3 significantly limits the amount of data needed within the illuminator itself (reducing illuminator cost), and takes advantage of the large data memory typically available in a camera core. In an alternate embodiment, the resistors R1 and R2 can be replaced with another (typically numeric) information source, such as a circuit that provides a digital value as to illuminator type. This is illustrated in FIG. 3 as the generalized dashed-line block 360 surrounding the illustrative resistors. Where the information is in a digital (or other directly readable form), the sense circuit can be a circuit or function adapted to read the information for its value, which is then passed on to the lookup process 340. Notably, the illustrative arrangement allows the camera to be updated to account for new types of illuminators, which become part of the on-board/integrated data store 270 as they become available.

By way of example, when a camera is updated via its interface link, it can receive several new types of illuminator with associated numerical data look-up values and parameters (e.g. new types 33-48). Some of these new types can be improved versions of an existing illuminator, in which a higher intensity, lower-power LED arrangement is employed. Because constant improvement in LED technology leads to more efficient illuminators, it is significant to be able to accommodate the ability to change out an older illuminator with a newer, more efficient illuminator. If the new operating parameters are not accommodated, the camera may overdrive the new, more-efficient illuminator by using the old settings. The illustrative embodiment ensures that the settings are proper to the new illuminator, eliminating the risk of over-driving the new replacement unit.

Figure 4:
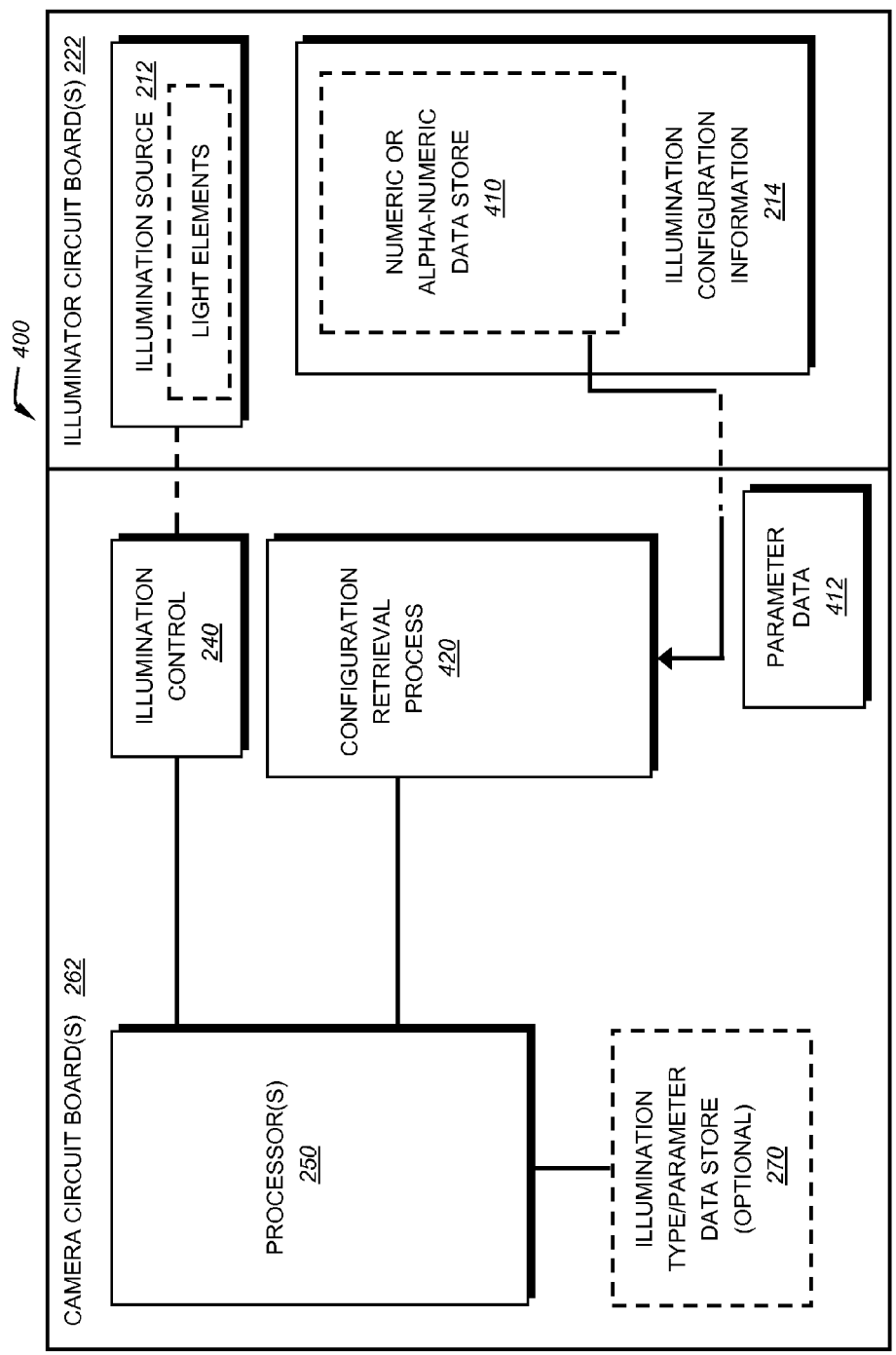
FIG. 4 is a is a block diagram showing a data store on an illuminator circuit board using a memory that provides alpha-numeric information directly related to the parameters of the illuminator and a data path into the camera processor/core according to an embodiment.

While it is generally advantageous to provide the parameter information within a store integrated with the camera, there are various embodiments that can benefit from providing some or all of the actual parameter data directly integrated with the illuminator itself. FIG. 4 shows a more detailed block diagram 400 of the circuit boards (222, 262) with respect to FIG. 2 in which numeric or alphanumeric parameter data 412 is stored within a circuit or other memory device 410 integrated with the illuminator. In this case, the retrieval process 420 within the camera directly provides the parameter data 412 to the settings process within the processor/core 250. The parameter data on a particular illuminator is formatted in a known manner that enables the parameters of any illuminator within a given group of illuminator types to be read and used to set camera and/or illumination control settings. In this manner, both the illuminators "information source" and the configuration "data store" are a single element that is integrated with the illuminator and not the camera. In this embodiment, the camera can store information (for example in data store 270) that allows the settings process to be upgraded to accommodate new types of parameters if they are provided on a newer illuminator.

Figure 5:
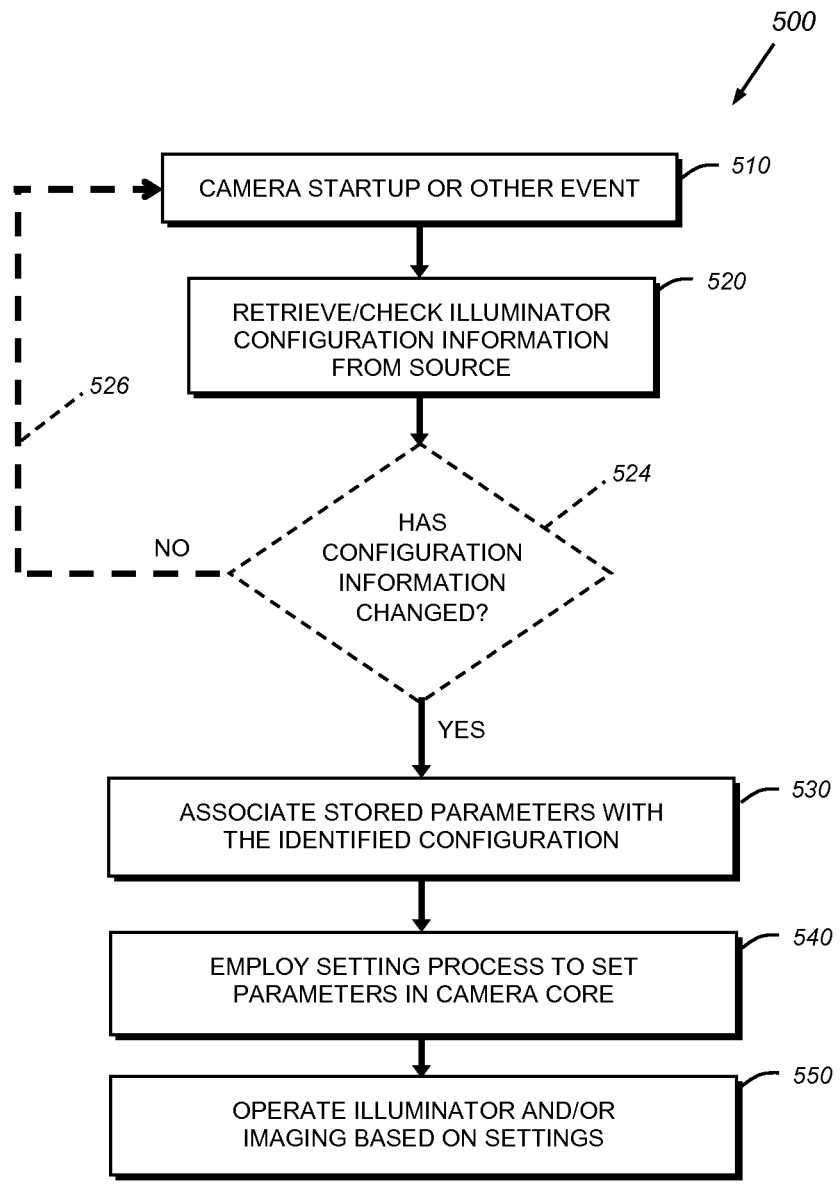
FIG. 5 is a generalized flow diagram of an illuminator identification and control process according to an embodiment.

FIG. 5 shows a generalized flow diagram 500 for runtime configuration of a vision system camera arrangement using an illuminator in accordance with an illustrative embodiment, such as that shown in FIGS. 2 and 3. Either during startup (step 510) or at another time (e.g. upon upgrade or illuminator installation), or based upon a given event (see below), the configuration process 500 checks the information source integrated with the illuminator for the stored configuration information (step 520). Optionally (see below) the process 500 can then use a decision step 524 (shown in phantom as optional, and described further below) to decide whether the configuration information has changed since the last performance of the process 500. This can comprise a comparison of the retrieved information with a stored/cached version of the information in the core. If the information is unchanged the process can return via branch 526 to step 510 to await the next event. If the information has changed, the process 500 proceeds to the next step 530. In step 530, based upon the retrieved information (e.g. a type number), the camera processor/core accesses the specific parameters associated with the illuminator's type number. Note that the optional decision step 524 can also be performed after step 530. In either case, the decision step can serve to reduce processing overhead by avoiding resetting parameters in the next step (setting process step 540). The settings process step 540 then applies the parameters to illumination control and/or the camera's image acquisition functions to enable proper operation of the arrangement during runtime operation (step 550). The settings can be retained after camera shutdown, or reset each time the configuration process 500 is performed.

In an alternate embodiment the parameter-information-retrieval and setting process (500 above) can be performed at various times during the operation of the camera arrangement (e.g. during runtime). The timing of the performance of the process can be random, semi-random, continuous (e.g. a regular polling of the information on the illuminator), or based on an event, such as a certain elapsed time after a prior event (e.g. startup or the previous performance of the process) or after a given number of images have been acquired. In performing the process, a decision step 524 (described above), can be used to confirm that the current configuration settings have not changed from a previous check of the information in the illuminator. If so, the process can return to await the next event (step 510) rather than performing the full settings process, thereby reducing some processing overhead.

Figure 6:
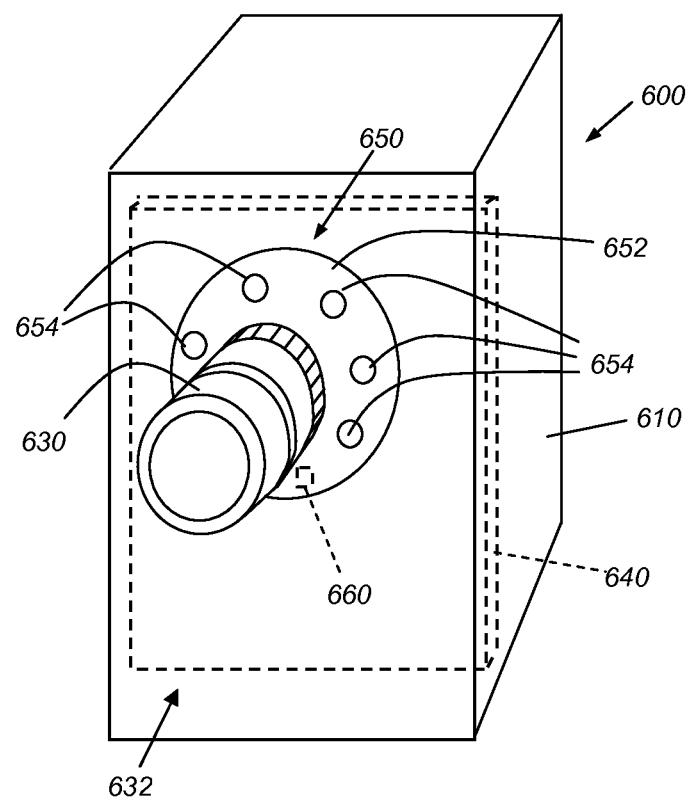
FIG. 6 is a diagram of a vision system camera according to another embodiment having a ring illuminator surrounding a lens having stored parameter information.

FIG. 6 shows an alternate embodiment of a vision system camera arrangement 600 that includes a housing 610 with a lens assembly 630 on its front face 632. One or more circuit boards (e.g. circuit board 640, shown in phantom) are enclosed within the housing, and include a sensor and other processing components (collectively termed a "processor" or "core") that allow control of camera settings and the illuminator assembly 650. These elements can function generally in the manner described above (see, for example, FIG. 2). That is, the processing components can retrieve parameter information from the illuminator and employ this information to operate a settings process that sets the camera to properly control the illuminator and/or the camera's image acquisition based on the parameters. In this embodiment, the illuminator assembly 650 is a ring illuminator mounted on the front face 632 and surrounds the lens 630. It comprises a circuit board 652, with a plurality of light elements (e.g. LEDs) 654. The circuit board includes an integrated information source 660, as described herein, that is interconnected as described above with the processor components (e.g. board 640). In this embodiment, the ring illuminator is assembled by the manufacturer, and can be either fixed or removable, based upon the mounting technique employed and/or electrical connections. The stored information (660) is provided to the processor/core as described above to allow control of the illuminator and/or image acquisition functions. Various interconnections and interface links (not shown) can be used to allow transfer of power and data as appropriate. This arrangement ensures that the proper setting to control the illuminator and/or camera are provided for a give installed illuminator. In addition to making upgrades to new illuminators easier, this also aids the manufacturing process and ensures quality.

Figure 7:
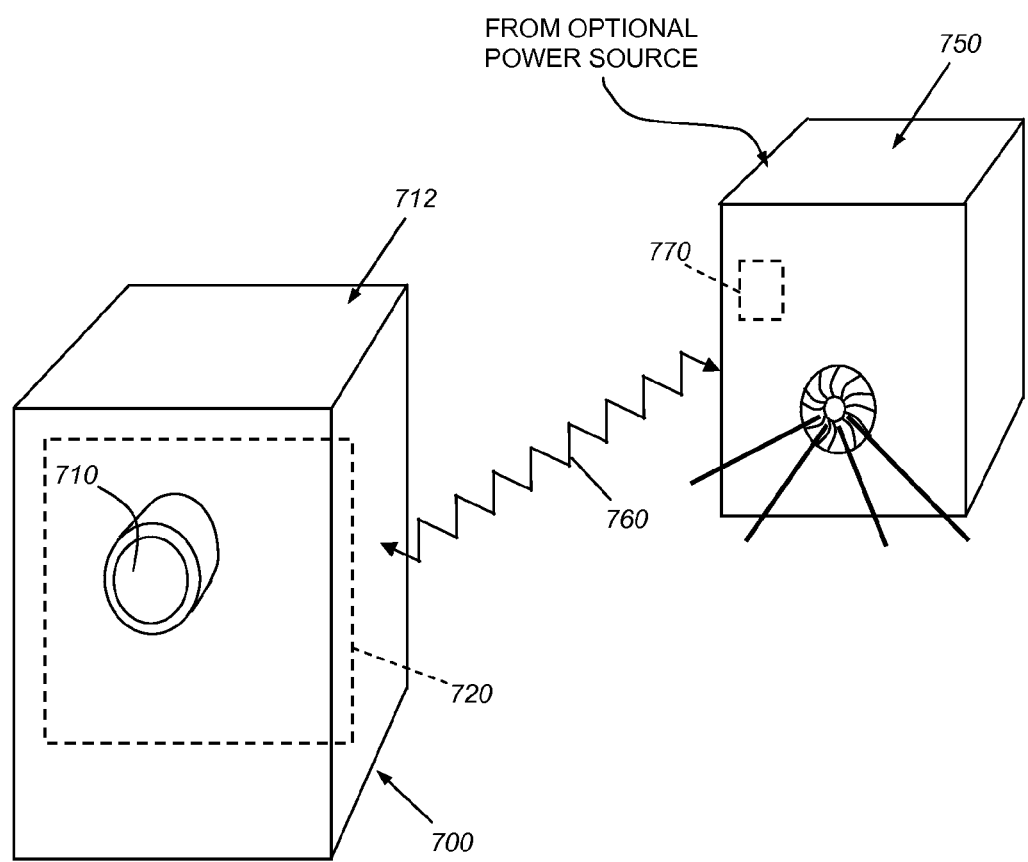
FIG. 7 is a diagram of a vision system camera in communication with an external illuminator having stored parameter information according to yet another embodiment.

FIG. 7 is another embodiment showing a generalized vision system camera assembly 700, having a lens 710, and a housing 712 that encloses as sensor and various processing components (i.e. the "processor" or "core") on one or more circuit boards (e.g. board 720, shown in phantom). The processing components function generally in a manner described above. That is, the processing components can retrieve parameter information from the illuminator and employ this information to operate a settings process that sets the camera to properly control the illuminator and/or the camera's image acquisition based on the parameters. In this embodiment, the illuminator 750 is shown mounted in an external configuration. The type of illuminator is highly variable, and the example in this arrangement is a strobe. In this example, the illuminator 750 receives power from an external source. In alternate embodiments power can be provided by the camera 700. The illuminator 750 is interconnected with the camera 700 and its associated processing components by a link 760 that can be wired, wireless or both. This link provides control and trigger data as well as information related to the illuminator's parameters, which is stored in an information source represented by dashed box 770. The retrieval of parameter information by the camera processor occurs in a manner described above. In this case the data travels from a remote location where the illuminator is mounted via the link 760. The information source 770 can be mounted on a circuit board of the illuminator or otherwise interconnected so that it can provide the parameter-related information over the link. In any of the embodiments herein, the parameter information transferred from the illuminator can be a numeric (or equivalent) value that is used by the camera to access a data store with parameter sets, or it can be some or all of the actual parameter information in numeric or alphanumeric form.

It should be clear that the illuminator and associated vision system camera of the various embodiments described herein provides a straightforward and highly reliable system and method for accommodating differing types of illuminators. This system and method avoids the risk of providing improper settings to the camera, and ensures that any upgrades and/or improvements in the illuminator are readily accommodated by the camera.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, any of the processes or procedures performed herein can be accomplished using electronic hardware, software, in the form of a non-transitory computer-readable medium of program instructions, or a combination of hardware and software. Also, the term "process" is used herein should be taken broadly to include hardware and software based process blocks, which can be combined, in whole or in part, with other process blocks. Likewise, a given process or processor can be divided into a plurality of sub-processes or sub-processors as appropriate. Moreover, where a numerical value is specified, this value can be equivalently provided as a series of letters or other symbols (either single letters/symbols or combinations of letters/symbols) that allow differentiation between states to allow identification of a type of illuminator. Thus the term "numeric" or "numerical" should be taken broadly to include other symbols besides numbers. additionally, where components are shown residing on a particular circuit board, this is meant to be by way of example of a variety of techniques for mounting and integrating various electronic components, which can include placing certain components on discrete circuit boards or other packages that can be fixed or removable (e.g. a removable flash memory for storing various settings, configuration and other data). Accordingly, this description is meant to be taken only by way of example, and not to otherwise limit the scope of this invention.

What is claimed is:

1. A system for controlling illumination of a vision system camera having an image sensor comprising:
   a vision system camera having an image sensor that performs image acquisition;
   an illuminator coupled to the vision system camera;
   an information source operatively connected with the illuminator that stores predetermined information indicative of parameters of the illuminator;
   a controller being constructed and arranged to read and identify the predetermined information and control at least one of (a) the image acquisition by the image sensor and (b) signals provided to control the illuminator based upon the parameters indicated for the illuminator; and
   wherein the predetermined information comprises a value that corresponds to a set of parameters for a predetermined type of illuminator, the set of parameters being stored with respect to the controller within a memory of the vision system camera.

2. The system as set forth in claim 1 wherein the illuminator is mounted on a housing of the vision system camera.

3. The system as set froth in claim 1 wherein the information source comprises an analog resistor arrangement integrated with the illuminator, the resistor arrangement having a predetermined resistance value associated with the predetermined type of illuminator.

4. The system as set forth in claim 1 wherein the memory comprises a data store having a plurality of entries, each with discrete parameters associated with a respective type of illuminator.

5. The system as set forth in claim 1 wherein the parameters of the illuminator include at least one of illuminator operating current, operating voltage, illumination intensity, and timing.

6. The system as set forth in claim 4 wherein the controller is constructed and arranged to retrieve the parameters from a data store integrated with the illuminator.

7. A system for controlling illumination of a vision system camera having an image sensor comprising:
   a vision system camera having an image sensor that performs image acquisition and a vision system processor;
   an illuminator removably coupled to the vision system camera;
   an information source integrated with the illuminator that stores predetermined information indicative of parameters of the illuminator;
   a controller, integrated with a processor core of the vision system camera, being constructed and arranged to read and identify the predetermined information and control at least one of (a) the image acquisition by the image sensor and (b) signals provided to control the illuminator based upon the parameters indicated for the illuminator; and
   wherein the predetermined information comprises a value that corresponds to a set of parameters for a predetermined type of illuminator, the set of parameters being stored with respect to the controller within a memory of the vision system camera.

8. The system as set forth in claim 7 wherein the illuminator is mounted on a housing of the vision system camera.

9. The system as set forth in claim 7 wherein the information source comprises an analog resistor arrangement integrated with the illuminator, the resistor arrangement having a predetermined resistance value associated with the predetermined type of illuminator.

10. The system as set forth in claim 7 wherein the memory comprises a data store having a plurality of entries, each with discrete parameters associated with a respective type of illuminator.

11. The system as set forth in claim 7 wherein the parameters of the illuminator include at least one of illuminator operating current, operating voltage, illumination intensity, and timing.

12. The system as set forth in claim 7 wherein the illuminator is mounted external of and remote from the housing and is interconnected thereto by a communication link.

13. A method for controlling illumination of a vision system camera having an image sensor comprising the steps of:
   coupling a first illuminator to the vision system camera;
   accessing, by a controller integrated with a processor core of the vision system camera, a first information source that is operatively connected with the first illuminator and that stores predetermined information indicative of parameters of the first illuminator;
   reading and identifying the predetermined information and controlling at least one of (a) the image acquisition by the image sensor and (b) signals provided to control the first illuminator based upon the parameters indicated for the first illuminator; and
   wherein the step of reading and identifying includes retrieving a numerical value representative of a type of illuminator and associating the numerical value with the parameters stored on a data store integrated with the processor core.

14. The method as set forth in claim 13 further comprising decoupling the first illuminator and coupling a second illuminator to the vision system camera, and
   accessing, by the controller integrated with the processor core of the vision system camera, a second information source that is operatively connected with the second illuminator and that stores predetermined information indicative of parameters of the second illuminator, and
   reading and identifying the predetermined information indicative of parameters of the second illuminator, and controlling at least one of (a) the image acquisition by the image sensor and (b) signals provided to control the second illuminator based upon the parameters indicated for the second illuminator.

* * * * *